United States Patent
McEvoy

[15] 3,681,698
[45] Aug. 1, 1972

[54] FAST-AVERAGING NOISE-SUMMING SIGNAL DETECTOR

[72] Inventor: William J. McEvoy, 5081 Aurora Drive, Ventura, Calif. 93003

[22] Filed: May 25, 1970

[21] Appl. No.: 40,029

[52] U.S. Cl. .................. 325/476, 325/324, 325/474, 325/478, 325/487, 325/333
[51] Int. Cl. ............................................. H04b 1/16
[58] Field of Search ...... 325/324, 333, 377, 404, 405, 325/410, 456, 478, 474–476, 319, 306, 373, 479, 483–485, 490

[56] References Cited

UNITED STATES PATENTS 3,213,450  10/1965  Goor ........................... 325/474
2,275,389  3/1942  Feldman ....................... 325/404
3,060,329  10/1962  Harrison et al. ............... 325/319

*Primary Examiner*—Albert J. Mayer
*Attorney*—Richard S. Sciascia, Baxter Warner and Howard J. Murray, Jr.

[57] ABSTRACT

An electrical circuit especially adapted for use in an AFS (automatic-frequency-scanning) receiver to provide reliable signal lock-on capability in the presence of varying noise levels. Two networks average the receiver power simultaneously. One of these networks has a long time constant (approximately 15 $\mu$ sec) and the other a short time constant (approximately 1 $\mu$ sec). The latter is constantly "corrected" by the long time constant network, thereby nullifying variations in the receiver output noise level and allowing the short time constant network to detect radar pulses of less than 0.5 $\mu$ sec duration.

8 Claims, 2 Drawing Figures

WILLIAM J. MC EVOY
INVENTOR

FAST-AVERAGING NOISE-SUMMING SIGNAL DETECTOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

So-called "squelch" and threshold-detection circuits generally function by pre-setting a bias level on a detector or amplifier component. Automatic lock-on circuits are in effect threshold detectors with a varying bias level. This is obtained by rectifying the noise output of the receiver and filtering with a long time constant.

However, most frequency-scanning receivers which use these circuits operate with a high percentage of false stops (cessation of scan). Increasing the threshold level in an attempt to eliminate these false stops effectively reduces receiver sensitivity by a corresponding amount and degrades its signal detection capability.

One example of a typical operational condition where known systems have proven to be deficient is that of an automatic-frequency-scanning receiver installed aboard an aircraft flying at an assumed altitude of 15,000 feet. The aircraft antenna may be of the directional type with an azimuth and elevation beam width of 40°, the beam being rotated in an azimuth plane at 350 rpm. Under such conditions, any one of the following factors may cause the receiver noise level output to vary:

a. Environmental - for example, if the aircraft is over the ocean, approaching an industrial city, it will normally be moving from a low ambient noise level to a higher one.

b. Antenna Movement - the rotating antenna one instant "looking" at an industrial area and the next out to sea, results in varying output noise levels.

c. Receiver bandwidth considerations.

d. Receiver internal noise figure (this increases as frequency increases).

e. Receiver I-F bandpass ripple.

f. Variation in receiver output noise due to changing frequency range, such as from low to high frequency limits of a tuner.

g. Receiver output noise level variations due to switching from one tuner to another.

h. Changes in receiver output noise levels due to any form of intermittent receiver blanking.

i. An increase in receiver output power occurring when the receiver locks onto a signal.

SUMMARY OF THE INVENTION

The present concept is directed to the maintenance of maximum detection sensitivity in receivers which are automatically frequency scanned and which are required to detect and lock onto the frequency of incoming pulse energy. The invention circuit adjusts automatically to maintain a fixed signal-to-noise detection ratio, even though the receiver noise output varies as a function of frequency due to internal and/or external conditions.

STATEMENT OF THE OBJECTS OF THE INVENTION

One object of the present invention, therefore, is to provide an improved signal detector for automatic-frequency-scanning receivers.

Another object of the invention is to provide a receiver having improved signal lock-on capabilities in the presence of noise.

A further object of the invention is to provide a circuit for AFS receivers which adjusts automatically to maintain a fixed signal-to-noise detection ratio.

Other objects, advantages and novel features of the invention will become apparent from the following detailed description of the invention when considered in conjunction with the accompanying drawings wherein:

DESCRIPTION OF THE PREFERRED EMBODIMENT

Figure 1:
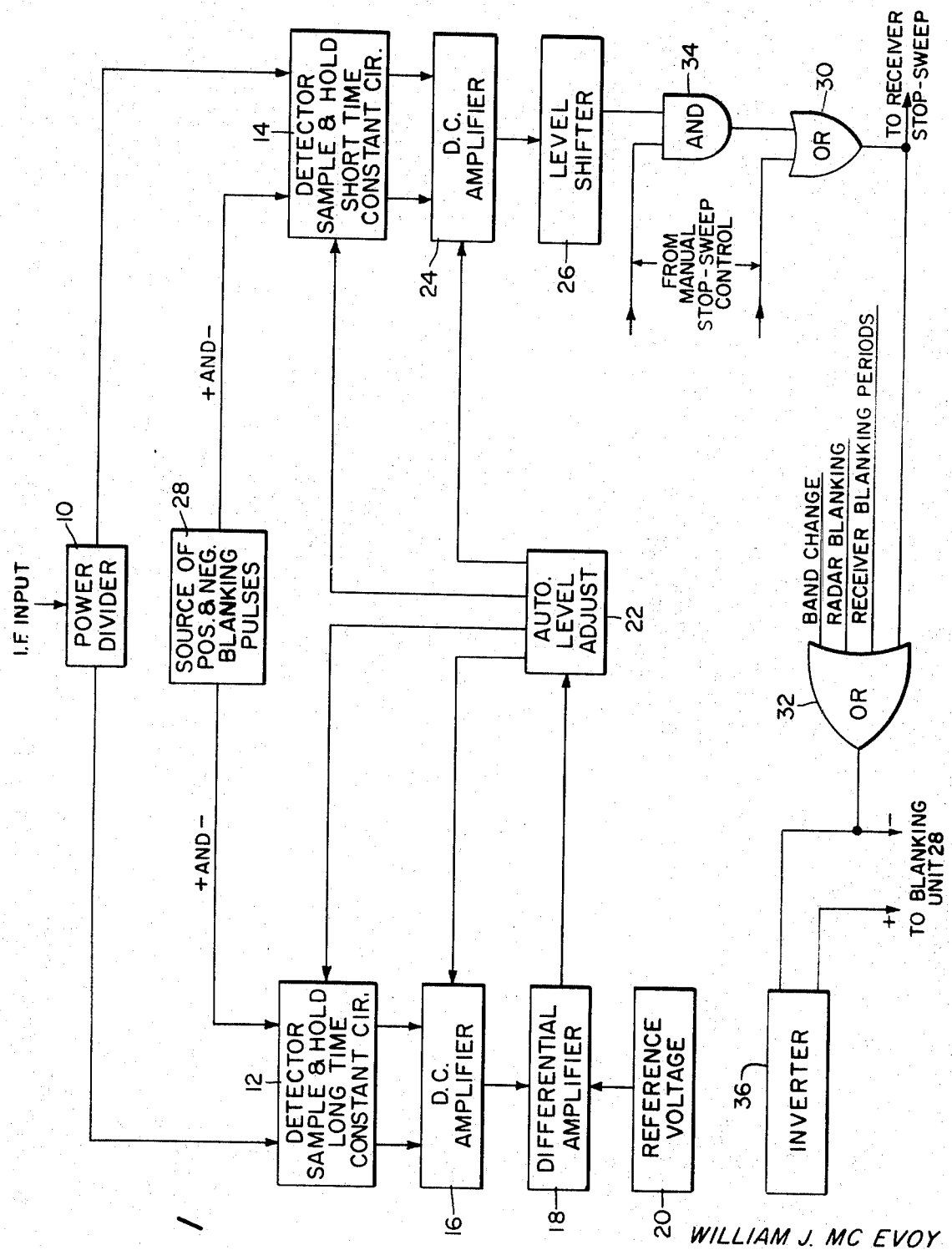
FIG. 1 is a schematic block diagram of a fast-averaging noise-summing signal detector assembly designed in accordance with a preferred embodiment of the present invention.

FIG. 1 of the drawings is a block diagram of a fast-averaging noise-summing signal detector assembly embodying the principles of the present concept. It is made up of two sub-circuits designed to average the receiver output power simultaneously. As shown, an input signal from the receiver I.F. section (having a bandwidth of, say, 20 MH$_z$) is applied to a conventional power divider 10 with balanced outputs. One of these outputs is applied to a network 12, which combines a detector, sample and hold unit, and longtime-constant circuit, while the other output of power divider 10 is applied to a further network 14 which is similar to network 12 but is designed to possess a short time constant. These networks 12 and 14 will be described in detail in connection with a discussion of FIG. 2. At this point, however, it need only be recognized that the time constant of network 12 is approximately 15 $\mu$ sec, while the time constant of network 14 is approximately 1 $\mu$ sec. The former is a relatively short period compared to the period of the receiver output level variations, and hence network 12 will provide fast summing of this output. The short time constant of 1 $\mu$ sec is selected to provide fast averaging of the receiver noise by network 14, and this network will take on an additional charge when a 0.5 $\mu$ sec radar pulse is received, as will be set forth hereinafter.

The short time constant network 14 is constantly being corrected by the long time constant network 12, thereby nullifying variations in the receiver output noise level, and allowing network 14 to detect radar pulses and emitters. Such correction is accomplished by feeding the output of network 12 through a d-c amplifier 16 to a differential amplifier 18. A reference voltage from unit 20 is also supplied to the differential amplifier 18, and the output of the latter is fed back through an auto level adjust circuit 22 to control the gain of the d-c amplifier 16. The auto level adjust circuit 22 receives the level changes from the differential amplifier 18 and converts them into the required bias level for amplifier 16 and for the time constant circuit of unit 12. It always seeks to maintain the output level of differential amplifier 18 at zero.

The output of network 14 is applied to a d-c amplifier 24 and thence to a level shifter 26. As shown in FIG. 1, both network 14 and amplifier 24 receive the output of the auto level adjust unit 22.

Consequently, the reference voltage from unit 20 holds the long-time-constant output of the amplifiers 16 and 18 at zero logic level. Therefore, the short-time-constant of amplifier 24 always remains at this zero logic level state until a 0.5 $\mu$ sec pulse is received. This drives the output level of amplifier 24 to the positive level state. The short time constant period (1 $\mu$ sec) is relatively long compared to the noise peaks, thereby preventing a level shift on noise and similar spurious detections.

Sample and hold circuits incorporated in networks 12 and 14 (see FIG. 2) and operated by blanking pulses from source 28 prevent upsetting of the time constants and d-c amplifier levels during periods of signal lock-on, tuner switching, flyback, etc.

Figure 2:
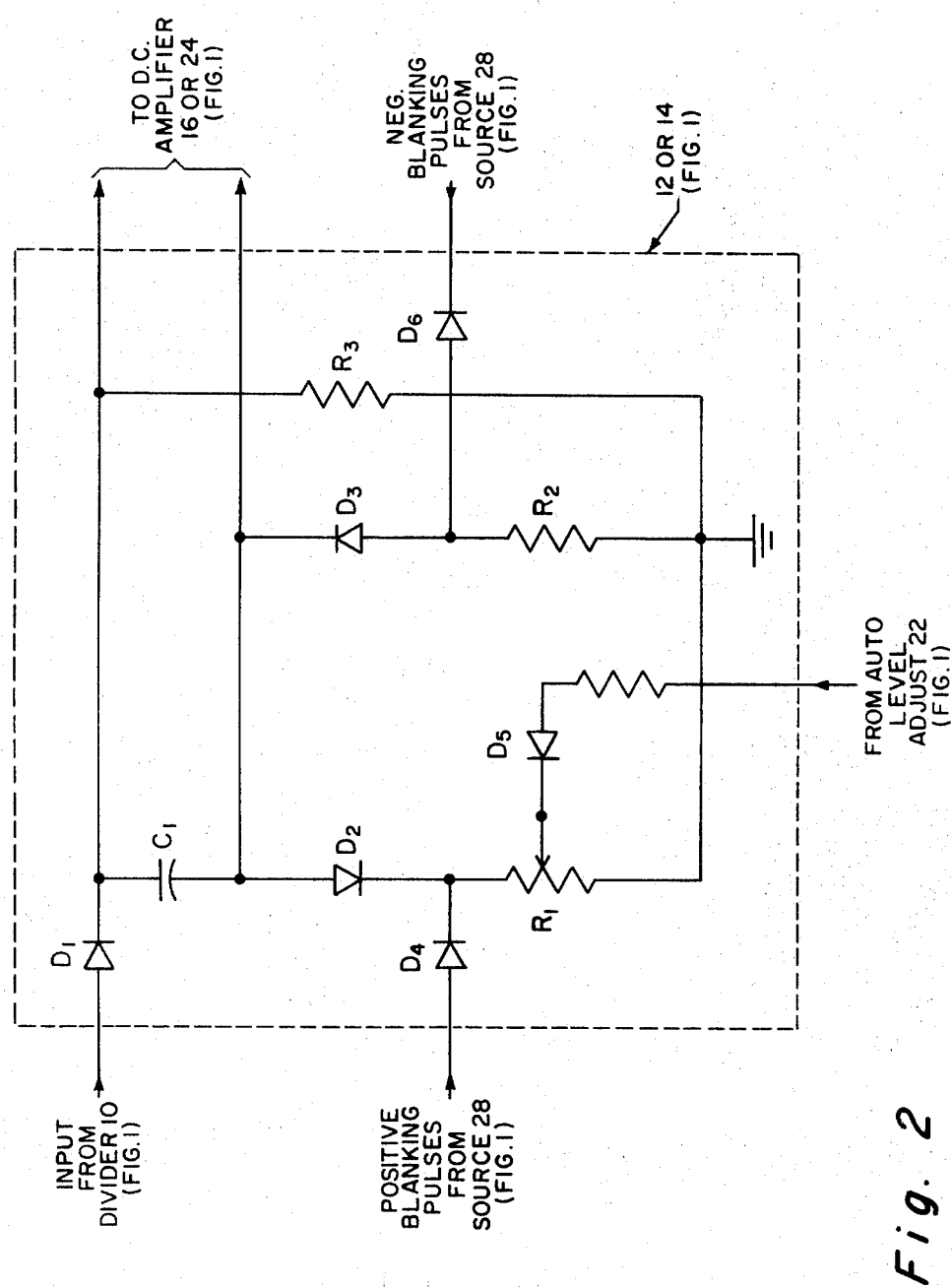
FIG. 2 is a schematic circuit diagram of two of the units of the detector assembly of FIG. 1.

The two detector, sample and hold, and time constant circuits 12 and 14 of FIG. 1 are identical except for the respective resistor-capacitor values, and hence will be described together in connection with FIG. 2 of the drawings.

The detector function of these units is performed by $D_1$, which receives the I-F signal. The charge time constant path for this component is through $C_1$ $D_2$ and $R_1$, as shown in the drawings. $C_1$ discharges through $D_3$ $R_2$ and $R_3$. The value of $R_2$ should be small with reference to $R_1$ in order to allow $R_3$ to present the highest practical impedance to the charging path of $C_1$. The function of $R_2$ is to develop a negative bias when negative blanking pulses are applied from source 28 (FIG. 1), thereby preventing the discharge of $C_1$. Positive blanking pulses from source 28 applied to $R_1$ prevent $C_1$ from charging during the blanking period.

$C_1$ cannot charge or discharge when the blanking pulses are applied, and hence this constitutes the "sample and hold" circuit.

$R_3$ should be approximately three times the value of $R_1$ for two reasons - (1) to present a high impedance to the charging path, and (2) to provide a longer discharge time constant which will act as an "antihunt" circuit when a bias voltage from the auto level adjust network 22 of FIG. 1 is received. $R_1$ is a potentiometer through which this auto level adjust bias is applied, maintaining a constant noise level change on $C_1$. The auto level adjust bias voltage is initially set by $R_1$ so that the major portion of the average noise power output of the receiver is biased out, preventing $C_1$ from taking on much of a charge, and automatically held at that level by the varying output from the differential amplifier 18 via the auto level adjust network 22.

However, when an R-F pulse arrives at divider 10, $C_1$ in unit 14 will take on a charge, and this potential increase stops the receiver sweep. At the same time, $C_1$ in unit 12 takes on a relatively small charge which, after passing through differential amplifier 18, provides an insignificant change in the bias voltage from auto level adjust network 22. This is so because as soon as unit 14 detects a signal, blanking is applied.

Diodes $D_2$, $D_3$, $D_4$, $D_5$ and $D_6$ are isolation diodes which prevent the blanking pulses and the auto level adjust bias voltage from placing any charge on $C_1$. The output is taken across $C_1$ by the high-impedance amplifiers 16 and 24 of FIG. 1, and converted into respective single-ended outputs as illustrated. The high input impedance of these amplifiers prevents draining any charge from $C_1$ during circuit operation.

If it be assumed that the charge level of $C_1$ in unit 12 is approximately 30 percent of its time constant charging level, then this level is maintained as follows:

1. When the receiver output noise level increases, the charge on $C_1$ starts to increase.
2. This level is detected, amplified at 16, and fed to the differential amplifier 18.
3. A constant reference voltage level from unit 20 is also fed to the differential amplifier 18.
4. The differentiator-amplifier output is applied to the auto level adjust circuit 22, which in turn provides increased bias on $R_1$ and reduces the gain of the D-C amplifiers 16 and 24.

In the above manner, the charge on $C_1$ is held to within ± 10 percent of its reference level. This reference level is selected so that the average noise level out of the D-C amplifier 24 is maintained at the zero logic level. The level change required for the level shifter 26 to shift states is also an advantage, as this eliminates false detections due to bias level changes, etc.

As above stated, the auto level adjust circuit 22 receives the level changes from differential amplifier 18 and converts them into the required bias levels for the d-c amplifiers 16 and 24 and the time constant circuits of units 12 and 14. Circuit 22 always seeks to maintain the output level of the differential amplifier 18 at zero.

The OR gate 30 (FIG. 1) acts to stop the receiver sweep when a signal is received at divider 10. The output of gate 30 is also applied to a further OR gate 32 to automatically activate the blanking circuits. A signal from the receiver manual stop-sweep control is additionally applied to gate 30 to insure that blanking is carried out.

The OR gate 32 provides for blanking the receiver without stopping the sweep. This is required for the periods between band changes, radar blanking (if the receiver is to be employed in the vicinity of radar transmitters) and for receiver blanking on synthesizer spurious responses. The OR gate 32 provides negative and positive signals to blanking unit 28 by direct connection and through inverter 36 respectively.

To activate the system of FIG. 1 after detection of a signal and blanking has been applied, the level shifter 26 is disabled for approximately 15 microseconds, and the OR gate 32 is activated for this same period. This allows time for the signal to be tuned outside the receiver passband, and also permits the short time constant circuit of unit 14 to equalize. This function can also be accomplished by AND gate 34, as shown in FIG. 1.

When the arrangement of the present invention is utilized, it is possible to always maintain receiver sensitivity at a maximum level, together with an unusually high capability of discriminating between r-f signals and noise. Furthermore, false signal lock-ons due to varying noise levels are held to a minimum. When applied to communications receivers, audio noise outbursts in headsets and speakers are virtually eliminated. Voice-operated relays and teletype circuits also leave their operation improved when the principles of the present invention are embodied therein.

Obviously many modifications and variations of the present invention are possible in the light of the above teachings. It is therefore to be understood that within the scope of the appended claims the invention may be practiced otherwise than as specifically described.

I claim:

1. A circuit for use in an automatic-frequency-scanning receiver in order to provide reliable signal lock-on capability in the presence of varying noise levels, said circuit comprising:

means for dividing the receiver I-F output energy into two equal parts;

a pair of detector networks each receiving an equal part of the I-F energy so divided;

one of said networks including a first resistance-capacitance unit having a long time constant which is relatively short compared to the period of the receiver I-F output variations;

the other of said networks including a second resistance-capacitance unit having a short time-constant which is short compared to that of the resistance-capacitance unit included in said one network; and means for applying the output of said one network to "correct" the output of said other network so as to minimize the effect of variations in the output noise level on the receiver's signal lock-on capability.

2. A circuit for use in a signal receiver having an I-F amplifier section, said circuit comprising:

means for dividing the signal output of said I-F amplifier section into two equal parts a first detector network receiving one part of the divided I-F signal a second detector network receiving the other part of the divided I-F signal a second detector network receiving the of the part of the divided I-F signal said first detector network including a long time constant circuit the period of which is short compared to the period of the receiver output level variations said second detector network including a short time constant circuit the period of which is short compared to that of the time constant circuit included in said first detector network a pair of d-c amplifiers respectively receiving the outputs of said two detector networks a differential amplifier to which the output of said first detector network is applied an auto level adjust circuit receiving the output of said differential amplifier a level shifter receiving the output of the d-c amplifier connected to said second detector network, and means for applying the output of said auto level adjust circuit to both detector networks and also to both d-c amplifiers, the auto level adjust circuit receiving level changes from said differential amplifier and converting these changes into a bias level for both the d-c amplifier connected to said first detector network and for the time constant circuit of such first detector network, the gain of the d-c amplifier connected to said first detector network being thus controlled to maintain the output level of said differential amplifier at zero, whereby the d-c amplifier connected to said second detector network remains at the zero logic level until a signal is detected by said receiver, whereupon the output level of such amplifier is driven to the positive level state.

3. The combination of claim 2 in which each of said detector networks includes a sample and hold circuit which acts to prevent change of time constants and d-c amplifier levels during periods of signal lock-on.

4. The combination of claim 3 further including a source of blanking pulses, and means for applying blanking pulses from said source to each of said detector networks to control the respective sample and hold circuits included therein.

5. The combination of claim 4, further including a source of reverence voltage, and means for applying a reference voltage from such source to said differential amplifier.

6. The combination of claim 5 further including a source of receiver stop-sweep control voltage, a first OR gate, and means for selectively applying to said first OR gate a receivers stop-sweep control voltage from said source and also the output of said level shifter.

7. The combination of claim 6, further including a second OR gate to which the output of said first OR gate is applied, said second OR gate acting to automatically control the application of blanking pulses to blank the receiver without stopping the sweep.

8. The combination of claim 7, further including means for selectively applying to said second OR gate a receiver blanking signal during periods between band changes or upon the reception of spurious energy variations.

* * * * *